United States Patent [19]

Perego

[11] 4,337,951
[45] Jul. 6, 1982

[54] PRESSURIZED FACE SEAL WITH INITIAL RUN-IN SURFACE

[75] Inventor: Ambrogio Perego, Wettingen, Switzerland

[73] Assignee: BBC, Brown, Boveri & Company Ltd., Baden, Switzerland

[21] Appl. No.: 193,359

[22] Filed: Oct. 2, 1980

[30] Foreign Application Priority Data

Oct. 16, 1979 [CH] Switzerland ........................ 9293/79

[51] Int. Cl.³ .......................... F16J 15/38; F16J 15/48
[52] U.S. Cl. ....................................... 277/27; 277/53; 277/83; 277/96.1; 277/173
[58] Field of Search ................. 277/1, 3, 9, 27, 40, 277/41, 53, 54, 83, 93 R, 93 SD, 96, 96.1, 173

[56] References Cited

U.S. PATENT DOCUMENTS

| | | | |
|---|---|---|---|
| 2,221,225 | 11/1940 | Weis et al. | 277/27 |
| 3,093,382 | 6/1963 | Macks | 277/96.1 X |
| 3,529,839 | 9/1970 | Greiner et al. | 277/27 X |
| 3,606,350 | 9/1971 | Gravelle | 277/27 |
| 3,685,839 | 8/1972 | Frei | 277/27 |
| 3,823,950 | 7/1974 | Pederson | 277/53 X |

FOREIGN PATENT DOCUMENTS

| | | | |
|---|---|---|---|
| 446836 | 5/1936 | United Kingdom | 277/83 |
| 996546 | 6/1965 | United Kingdom | 277/27 |

*Primary Examiner*—Robert S. Ward, Jr.
*Attorney, Agent, or Firm*—Werner W. Kleeman

[57] ABSTRACT

In order to seal a rotating shaft in relation to a stationary housing portion or part a sealing bushing is arranged between both of these parts. The sealing bushing, while forming a sliding fit and being non-rotatable during operation, is arranged in a housing bore of the housing part and forms with a rotor portion or part arranged upon the shaft a contactless labyrinth seal. This sealing bushing bears in axial direction towards a side impinged with lower pressure, by means of a first sealing surface which tends to wear rather markedly during the running-in time of the sliding bushing, against a second sealing surface which is arranged at a rotor part rotatable relative thereto. To limit this wear and to obtain a sealing bushing which is free of play and contactless at the sealing region the sealing bushing is provided with a stop which, following the initial play, after expiration of the running-in time, bears against the stationary housing portion and thus limits the wear of the first sealing surface to a predetermined value.

11 Claims, 4 Drawing Figures

PRESSURIZED FACE SEAL WITH INITIAL RUN-IN SURFACE

BACKGROUND OF THE INVENTION

The present invention relates to a new and improved construction of a sealing arrangement for sealing a rotating part in relation to a stationary part, wherein at both sides of the sealing location there prevails a different pressure. The invention further relates to the use of the inventive sealing arrangement.

It is already known to seal the bearing spaces of compressors and turbines at the passage locations of the shafts by means of piston rings arranged in shaft grooves. Since a large pressure gradient prevails between the spaces or chambers which are to be sealed the piston ring is pressed by virtue of the axial thrust acting thereon against the rotor shoulder. Consequently, there arises a continuous wear of the friction surfaces.

Such design is associated with the drawback that the shaft is weakened by the groove needed for receiving the piston ring, and that the piston ring is subject to relatively great wear.

To limit this wear it would be possible to provide the housing bore with a shoulder, against which there could be supported the piston ring in axial direction. But such shoulder is cumbersome to fabricate and to produce with the required dimensions.

SUMMARY OF THE INVENTION

Therefore, with the foregoing in mind it is a primary object of the present invention to provide a new and improved construction of a sealing arrangement for sealing a rotating part in relation to a stationary part in a manner not associated with the aforementioned drawbacks and limitations of the prior art proposals.

Another and more specific object of the present invention aims at providing a new and improved construction of sealing arrangement which does not possess the above-described drawbacks of the heretofore used sealing arrangements, and specifically, wherein the wear is limited practically to a predetermined running-in time of the sealing arrangement, there does not arise any weakening of the shaft due to the provision of a groove or the like, and also there is not needed any undesired shoulder at the housing bore.

Now in order to implement these and still further objects of the invention, which will become more readily apparent as the description proceeds, the sealing arrangement of the present development is manifested by the features that between both of the parts which are to be manually sealed in relation to one another there is arranged a sealing bushing. This sealing bushing is centered upon one of these two parts while forming a sliding fit and being non-rotatable during operation. Further, the sealing bushing forms in conjunction with the other part a contactless seal. The sealing bushing bears in axial direction towards a side impinged with lesser pressure by means of at least one contact location forming a first sealing surface, at least following the running-in time of the sealing bushing, against a related second sealing surface located at a part rotating relative thereto. The sealing bushing possesses a stop or impact portion which, following the initial axial play, bears directly or indirectly at the part which is stationary relative thereto upon expiration of the running-in time, and therefore, limits the wear of the first and/or second sealing surface to a predetermined value.

It is advantageous if the sliding fit provided between the sealing bushing and the part which is stationary relative thereto is dimensioned such that upon wear of the first and/or second sealing surfaces there is accomplished, because of the pressure differential prevailing between both of the sides which are to be sealed, a displacement of the sealing bushing in its axial direction directed towards the side impinged with the lower pressure.

The invention also is concerned with use of the inventive sealing arrangement for sealing the bearing spaces or chambers of compressors and/or turbines at the points of through-passage of shafts.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
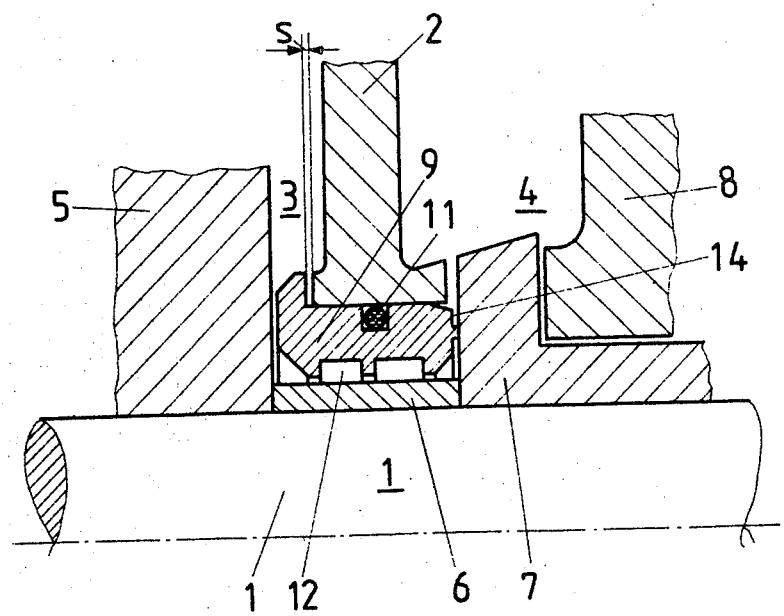
FIG. 1 is a longitudinal sectional view through a first exemplary embodiment of an inventive sealing arrangement, illustrating the upper half of the same and depicting the sealing arrangement prior to running-in of the sealing bushing.
Figure 1A:
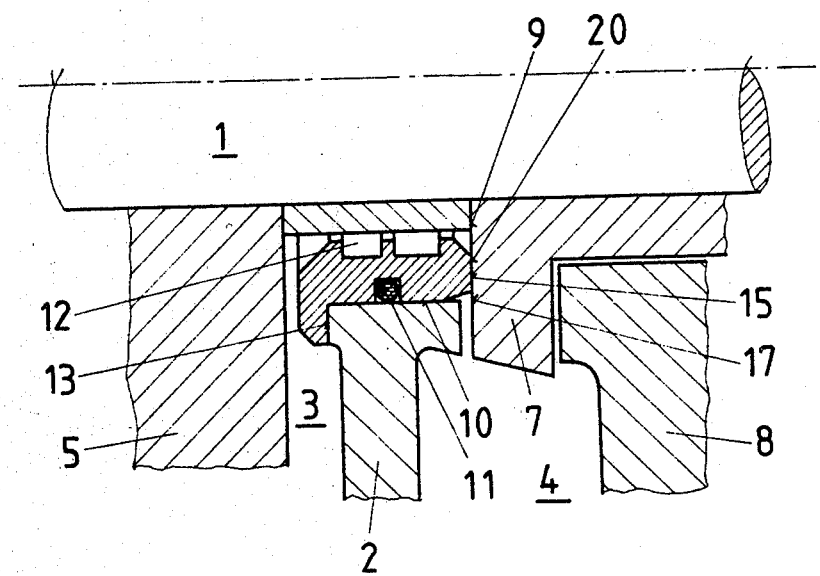
FIG. 1a is a longitudinal sectional view of the sealing arrangement shown in FIG. 1, depicting the lower half thereof, with the sealing arrangement being shown following the running-in of the sealing bushing.

Describing now the drawings, as will be seen from the showing of FIGS. 1 and 1a the illustrated sealing arrangement serves, by way of example and not limitation, for sealing a rotating shaft 1 in relation to a stationary housing portion or part 2, and in a compression chamber or space 3 there prevails an excess pressure in relation to a bearing chamber or space 4. Arranged upon the shaft 1 are the rotor parts or elements 5, 6 and 7. Reference chamber 8 designates part of a shaft bearing.

The housing bore 10 intended to receive the sealing bushing 9 and provided in the housing portion 2 possesses an essentially constant diameter throughout its entire length. The sealing bushing 9 is seated with a sliding fit in the housing bore 10, and this fit additionally is sealed by means of a suitable O-ring 11, which simultaneously prevents co-rotation of the sealing bushing 9 upon rotation of the shaft 1.

At the side of the shaft the sealing bushing 9 in conjunction with the rotor part 6 forms a labyrinth seal 12. By virtue of the excess pressure prevailing in the compression space 3 the end face or side 15 of the sealing bushing 9 and which is provided with recesses 14 so that during the running-in time of the sealing bushing 9 there results more rapid wear of such end face 15, is pressed against the rotating rotor shoulder 7. The play s, as best seen by referring to the showing of FIG. 1 and provided during the assembly of the sealing arrangement between the bushing collar 13, defining a stop or impact portion, and the bushing part or portion 2, corresponds to the wear desired at the end face 15 of the sealing bushing 9 during the running-in time. The depth of the recesses 14 or equivalent structure is less than the play s, so that following wear of the end face 15 by the amount of the play s which is limited by the bushing collar 13, there is present at this end face 15 a faultless first sealing surface 20 which sealingly coacts with an oppositely situated second sealing surface 17 provided at the rotor part or portion 7. The sliding fit provided between the sealing bushing 9 and the housing part 2 is dimensioned in such a manner that during the entire running-in time of the sealing bushing 9 the latter is pressed by the excess pressure prevailing in the compression space or chamber 3, at its end face or side 15, into contact with the rotor part 7.

The sealing bushing 9 consists of relatively soft material having good sliding properties such as, for instance, graphite-bronze, lead-bronze, gray cast iron, graphite, or plastic materials which possess such properties.

During the running-in phase the sealing bushing 9 is worn at its end face or side 15 until the bushing collar 13 bears against the housing portion or part 2, as best seen by referring to the lower half of the illustration of FIG. 1. Thereafter the seal operates almost without play and contact.

Figure 2:
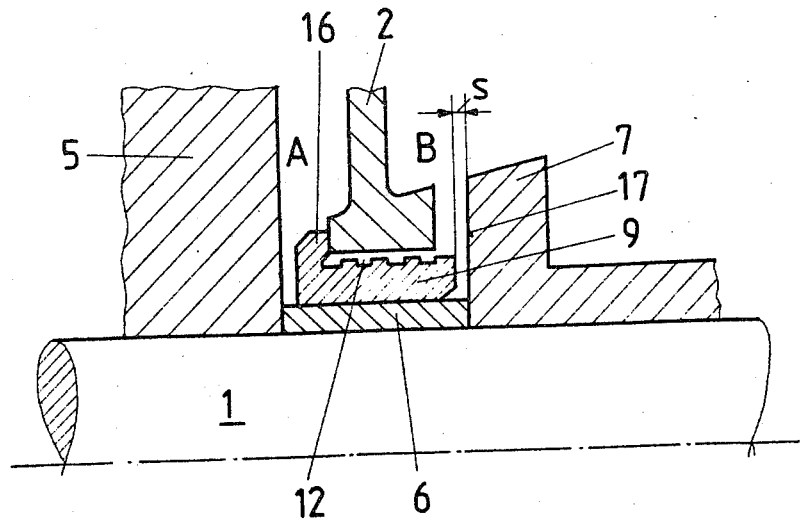
FIG. 2 is a longitudinal sectional view of a second exemplary embodiment of inventive sealing arrangement, analogous to the showing of FIG. 1, illustrating the upper half thereof and depicting the sealing arrangement prior to the running-in of the sealing bushing.
Figure 2A:
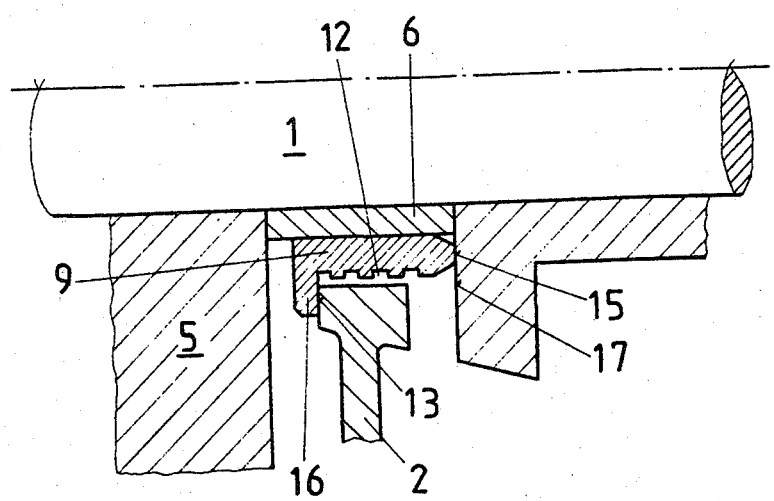
FIG. 2a is a longitudinal sectional view of the sealing arrangement shown in FIG. 2, depicting the lower half thereof and illustrating the sealing arrangement following the running-in of the sealing bushing.

With the second exemplary embodiment illustrated in FIGS. 2 and 2a there have been conveniently used generally the same reference characters to denote the same or analogous components. In the illustration of FIG. 2 there has been shown the sealing arrangement prior to expiration of the running-in phase and in FIG. 2a the sealing arrangement has been shown after expiration of the running-in phase.

With this embodiment the sealing bushing 9 is provided with a thin longitudinal or lengthwise slot 16, and thus such sealing bushing 9 is resilient in radial direction and can be clampingly seated upon the rotor part 6. The thus effective resilient or spring force is dimensioned such that the sealing bushing 9, during the running-in phase, is pressed by means of the excess pressure prevailing in the space 3, by means of its bushing collar 13 always into contact with the housing portion or part 2.

The degree of wear desired during the running-in phase at the bushing collar 13 is determined by the initial play s provided between the end face or side 15 of the sealing bushing 9 and the rotor shoulder 7.

The bushing collar 13 is worn during the running-in phase at the end face directed towards the housing portion 2 for such length of time until the end face 15 of the sealing bushing 9 bears against the rotor shoulder 7, as best seen by referring to the illustration of FIG. 2a. Thereafter the sealing arrangement works almost without play and without contact.

Also with this embodiment the housing bore 10 has a constant diameter over its entire length.

Of course, the arrangement of a slotted sealing bushing 9 upon the rotation rotor part 6 only can be used with a low-rpm machine, since in the case of a high-rpm machine the slotted bushing 9 would be spread apart under the action of the centrifugal forces, and thus, there would arise slip between the bushing 9 and the rotor part 6.

While there are shown and described present preferred embodiments of the invention, it is to be distinctly understood that the invention is not limited thereto, but may be otherwise variously embodied and practiced within the scope of the following claims. Accordingly,

What I claim is:

1. In a sealing arrangement for sealing a rotating part in relation to a stationary part, wherein at both sides of a sealing location between said two parts there prevails a different pressure, the improvement which comprises:

a sealing bushing arranged between both of the parts which are to be sealed in relation to one another;

said sealing bushing being centered upon one of such parts while forming a sliding fit and during operation being non-rotatable;

said sealing bushing forming together with the other part a contactless seal;

said sealing bushing in its axial direction directed towards a side of the sealing location impinged at lower pressure bearing by means of a contact location which, after expiration of a running-in time of the sealing bushing forms a first sealing surface, against a related second sealing surface located at the part rotating relative to the sealing bushing;

said sealing bushing being provided with a stop portion;

said stop portion following an initial axial play bearing, following expiration of the running-in time of the sealing bushing, at the part which is stationary with respect to said sealing bushing; and said stop portion limiting the wear of at least one of said sealing surfaces to a predetermined value.

2. The sealing arrangement as defined in claim 1, wherein:

said first sealing surface is formed of a material which tends to wear relatively extensively during the running-in time of the sealing bushing.

3. The sealing arrangement as defined in claim 1, wherein:

said sliding fit which is provided between the sealing bushing and the part which is stationary relative thereto is dimensioned such that upon wear of at least one of said sealing surfaces, due to the pressure differential prevailing between both sides of the sealing location which are to be sealed with regard to one another, there occurs a displacement of the sealing bushing in its axial direction which is directed towards the side of the sealing location impinged at lower pressure.

4. The sealing arrangement as defined in claim 1, wherein:

said sealing bushing is arranged upon said stationary part.

5. The sealing arrangement as defined in claim 1, wherein:

said contactless seal is structured as a labyrinth seal.

6. The sealing arrangement as defined in claim 1, wherein:

said sealing bushing is formed of a material selected from the group consisting essentially of graphite-bronze, lead-bronze, gray cast iron and graphite.

7. The sealing arrangement as defined in claim 1, wherein:

said sealing bushing is provided with a longitudinal slot; and said longitudinal slot imparting to said sealing bushing resiliency in radial direction for resiliently mounting said sealing bushing at the part which is stationary relative to the sealing bushing.

8. The sealing arrangement as defined in claim 1, wherein:
at least one of the sealing surfaces is provided with recess means whose depth in axial direction of the sealing bushing is less than the contemplated wear of such one sealing surface during the running-in time of the sealing bushing.

9. The sealing arrangement as defined in claim 8, wherein: said stop portion comprises a bushing collar.

10. The sealing arrangement as defined in claim 1, wherein:
said sealing arrangement is used for sealing the bearing spaces of compressors at a shaft throughpass location.

11. The sealing arrangement as defined in claim 1, wherein:
said sealing arrangement is used for sealing the bearing spaces of a turbine at a shaft throughpassage location.

* * * * *